J. C. ROSE & J. F. SILVERSMITH.
Improvement in Feather Renovators.
No. 116,101.  Patented June 20, 1871.
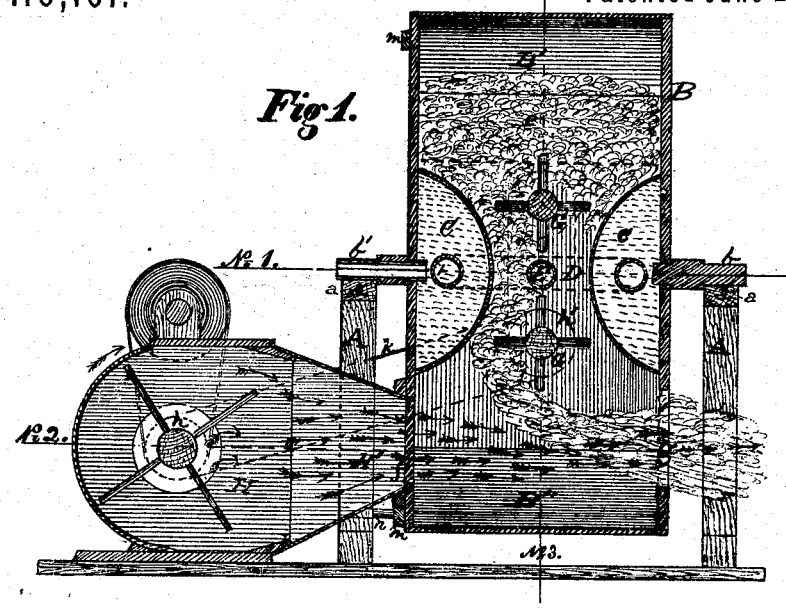
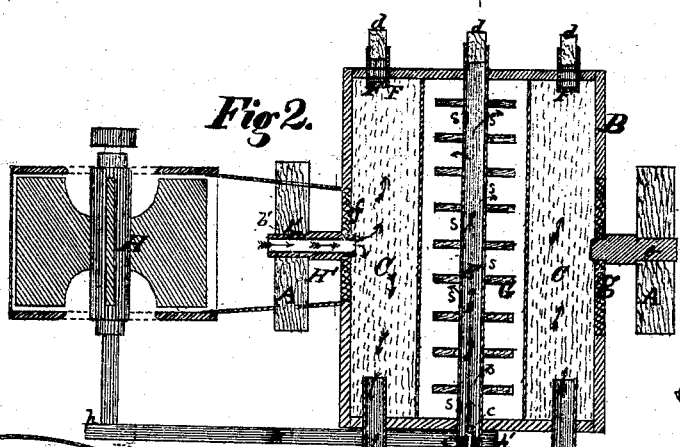
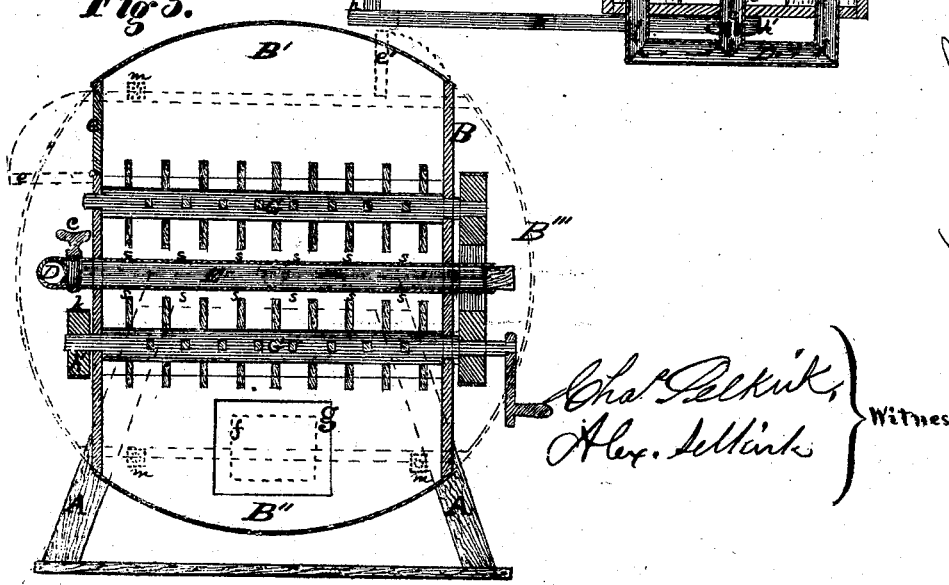

UNITED STATES PATENT OFFICE.

JAMES C. ROSE AND JOHN F. SILVERSMITH, OF ALBANY, NEW YORK.

IMPROVEMENT IN FEATHER-RENOVATORS.

Specification forming part of Letters Patent No. 116,101, dated June 20, 1871.

*To all whom it may concern:*

Be it known that we, JAMES C. ROSE and JOHN F. SILVERSMITH, of the city and county of Albany, State of New York, have invented certain new and useful Improvements in Feather-Renovators; and we do hereby declare that the following is a description thereof, reference being had to the accompanying drawing forming a part of this specification, in which—

Figure 1 is a side elevation of the machine embodying the improvements in this invention. Fig. 2 is a vertical view of the same through lines Nos. 1 and 2 in Fig. 1. Fig. 3 is a cross-section of the same through line No. 3 in Fig. 1.

Our invention relates to certain arrangements of steam-chambers and pipes and pickers within a swinging or revolving renovating-box, which will be capable of affecting any matted masses of feathers operated upon, to loosen and separate the same, and to impart to them the elastic and light qualities which are desirable, and tend to make a bed comfortable; also, to the use of a dry or warm blast upon the feathers as they are dropped down from above to below in the renovating-box to dry the same and separate any heavy or foreign matter that might be associated or mixed with the feathers.

To enable those skilled in the art to make and use our invention, we will proceed to describe it in reference to the drawing and the letters of reference marked thereon, the same letters indicating like parts.

In the drawing, A represents any suitable frame provided with bearings a a, which will be capable of supporting the renovating-box B. The said renovating-box is made of any suitable size and material, though preferably we would use wood, with a capacity of receiving about forty pounds of feathers into one of its feather-chambers, B' or B''. The said feather-chambers B' or B'' are placed at the ends of the said box B, and communicate with each other by the narrow passage-way (in which the pickers are placed) between the steam-chambers C C. Being thus placed, the said feather-chambers are made to act as hoppers, from which the feathers are to be fed from one feather-chamber to another. In the box B, and between the feather-chambers B' and B'', we place two D-shaped steam-chambers, C C.

The said steam-chambers are made steam-tight within, so as not to allow the escape of steam to the feathers; and are placed centrally within the box B, and opposite each other, at a little distance apart, as shown, so as to afford a passage-way between the same for communication of one feather-chamber to the other. The said steam-chambers are to act as heaters to maintain the temperature of the steam in the feather-chambers B' B'' to prevent its condensation, and also to dry (partially) the feathers previously to their being discharged from the box B. The curved or sloping side which the steam-chamber presents to the feather-chambers acts as the sides of a hopper to facilitate the movement of the feathers from one chamber to the other.

We are aware that steam-chambers have been used in feather-renovators; but they have been differently located and formed, and used only as heaters, and not to act as divisions and hoppers to a double feather-chambered box, as in our invention.

The steam-chambers C C are supplied with steam by means of the pipe D, shown by dotted lines in Fig. 1 and by full lines in Figs. 2 and 3, through one of the journals $b$, which is made hollow. Into the ends of the said steam-chambers, opposite the pipe D, we place the two short pipes, F F, which are to act as substitutes for safety-valves, and also as means for drawing off the water that may result from the condensation of the steam within. The said pipes F F we plug with wood to close and make tight the said steam-chambers. We place within the box B, and between the steam-chambers C C and the feather-chambers B' B'', the perforated steam-pipe E, which is fed from the pipe D to supply steam to the feather-chambers B' B''. A stop-cock or valve is provided in the pipe E to cut off or let on the steam as may be desired. As the said steam-pipe E has no immediate connection with the steam-chambers C C, the steam can be introduced within the feather-chambers B' B'' from time to time, as required, without affecting the supply of steam in the chambers C C. The said steam-pipe E, being located midway in the passage between the feather-chambers B' B'', is made to operate on the feathers as they are being passed in small quantities, from one chamber B' to the other by the pickers and causes the steam to act more effectively on the feathers than it would were the steam to act on a large quantity of feathers in bulk, as in machines heretofore used. The renovating-box B, provided with the feather-chambers B' B'', is supported on trunnions b b (one of which is hollow, as described) from the bearings a a of the frame A. Being thus swung, the positions of the feather-chambers B' and B'' can be reversed from time to time, as required, so that the feathers cast down in the lower chamber B'' can be carried in bulk above, as in chamber B', to be fed down again. This change of the position of the said feather-chamber is to be effected as often as it is required to have the feathers operated upon by the pickers. By the swinging of the said box B on the trunnions b b it is not intended that the said box shall be continually revolved, but that a convenient means will be afforded to effect alternate changes of the positions of the feather-chambers, as may be demanded in the process of the manipulation of the feathers. We place within the renovating-box the revolving pickers G G, in the passage-way between the steam-chambers C C, one above and the other below the perforated steam-pipe E, as shown in Fig. 3. Thus placed, the said pickers become located at the bottom of the feather-chambers B' B'', when the said chambers are brought in the position of chamber B'. The said pickers consist of short bars of wood set at different angles in the shafts, as shown in Fig. 1, and have their bearings in the side of the box B. The said pickers are revolved by band-wheels or pulleys operated by a crank or by any suitable power.

We are aware that revolving pickers have been used by others in renovating feathers; but such pickers were placed centrally within a single-chambered renovating-box, and were operated to affect the feathers as they lay in bulk in the lower side of such single-chambered box, and do not act on the feathers in small quantities to draw the same from the chamber B' to pass them to the chamber below in the while they are disintegrating the feathers, as in our invention. In the sides of one of the chambers B'' or B' we make doors f and g, as shown in Figs. 1 and 3, which doors are placed opposite the other, so that when the said doors are opened a free communication is had through the said chambers. We also make, in one of the feather-chambers B' or B'', a door, e, through which the feathers are introduced into the said feather-chambers. We connect with the feather-renovator a fan-blower, H, which blower is provided with any suitable snout or conductor, which will force a blast of air through the door f and through the lower feather-chamber B'' and out of the same, as shown in Figs. 1 and 2. The said blower is operated by any suitable crank, speeded by any suitable pulleys or gears, as may be required. The blower H is arranged to operate simultaneously with one or both of the pickers G, when desired, by means of the pulleys h and h' and the band k, and is intended to perform a threefold work, viz., the discharge of the feathers after they have been sufficiently operated upon by the steam and pickers, the drying of the feathers by wind, and also the sorting and separating of the quills and solid or foreign substances that may be in the feathers.

When the blower H is to be operated the snout of the same is made to connect with the open door f, as shown, and the door g, opposite, is also opened. The pickers are then connected with the blower by the band k and pulleys h h', when the fan is made to operate simultaneously with the pickers G, which pickers draw the feathers down from the upper chamber B' to fall into the lower chamber B'' to be operated upon by the blast, which blast drives the falling feathers out through the open door G. The feathers thus driven, being partially dried by the heat from the steam-chambers, are then thoroughly dried by the blast as they are driven out. The blast acting on the feathers drives the lightest to a considerable distance from the door g, while the heavier feathers will fall at a distance nigher the said door, and the quills and other heavy or foreign substances will drop down immediately outside the box.

We are aware that a blast has been applied to feather-renovators for the discharge of the same; but in those cases the said fans acted by suction or blast to operate on feathers as they lay in bulk, and not on small quantities drawn gradually down from above, and loosened up by pickers, as shown in our invention.

Having described our invention, what we claim, and desire to secure by Letters Patent, is—

1. The arrangement of the feather-chambers B' and B'' within the renovating-box B with a connecting passage between, whereby the feathers may be alternately received and discharged from one of the said chambers to the other in the process of the manipulations of the feathers, substantially as set forth.

2. The arrangement of the D-shaped steam-chambers C C centrally between the feather-chambers B' B'' and opposite each other, with a space between, whereby the said steam-chambers are made to act as heaters, hoppers, and divisions for the said feather-chambers B' B'', substantially as set forth.

3. The arrangement of the feed steam-pipe D, hollow journal b, and exhaust-pipes F F with the steam-chambers C C, whereby the said steam-chambers can be supplied with steam independently from the chambers B' B'', substantially as and for the purpose set forth.

4. The arrangement of the perforated steam-pipe E in the passage-way between the feather-chambers B' B and the steam-chambers C C to operate on the feathers when passing from one chamber B' to the other chamber B'', substantially as set forth and shown, for the purpose specified.

5. The arrangement of the trunnions b b and their bearings a a with the renovating-box B, provided with the two feather-chambers B' B'' placed opposite each other, whereby the said chambers may have their relative positions alternately reversed, substantially as and for the purpose set forth.

6. The arrangement of the pickers G G in the passage-way between the steam-chambers C C and feather-chambers B' B'', whereby the said pickers are rendered capable of operating on the feathers in small quantities to draw the same from the chamber B' above to the chamber B'' below in the while the said feathers are being disintegrated or otherwise manipulated, substantially as set forth.

7. The arrangement of the fan-blower H with a double-chambered renovating-box, provided with pickers G G placed between the chambers B' B'', and operating simultaneously with the same, whereby the feathers will be acted upon in small quantities to be discharged, dried, and sorted, substantially in the manner set forth.

JAMES C. ROSE.
JOHN F. SILVERSMITH.

Witnesses:
   CHAS. SELKIRK,
   ALEX. SELKIRK.